United States Patent [19]
Wiker

[11] Patent Number: 5,931,615
[45] Date of Patent: Aug. 3, 1999

[54] TWIST DRILL BIT

[75] Inventor: Juergen Wiker, Louisville, Ky.

[73] Assignee: Credo Tool Company, Woodburn, Oreg.

[21] Appl. No.: 08/832,289

[22] Filed: Apr. 3, 1997

[51] Int. Cl.[6] ............................................ B23B 51/00
[52] U.S. Cl. ................................ 408/230; 408/229
[58] Field of Search ........................ 408/230, 236, 408/59, 229, 227

[56] References Cited

U.S. PATENT DOCUMENTS

| | | |
|---|---|---|
| 5,036 | 3/1847 | Newton et al. . |
| 151,450 | 5/1874 | Tolman . |
| 180,554 | 8/1876 | Cubberley . |
| 308,707 | 12/1884 | Shirk . |
| 451,896 | 5/1891 | Merritt . |
| 750,537 | 1/1904 | Hanson . |
| 1,022,135 | 4/1912 | Heinkel et al. . |
| 1,407,546 | 2/1922 | Joseph . |
| 2,204,030 | 6/1940 | Say . |
| 2,258,674 | 10/1941 | Ceska . |
| 2,646,701 | 7/1953 | Letien . |
| 2,769,355 | 11/1956 | Crisp . |
| 2,966,081 | 12/1960 | Kallio . |
| 3,645,642 | 2/1972 | Koslow . |
| 3,863,316 | 2/1975 | Yeo . |
| 4,536,107 | 8/1985 | Sandy et al. . |
| 4,605,347 | 8/1986 | Jodock et al. . |
| 4,802,799 | 2/1989 | Rachev . |
| 4,871,287 | 10/1989 | Hougen . |
| 4,932,815 | 6/1990 | Krauss . |
| 4,967,855 | 11/1990 | Moser . |
| 4,968,193 | 11/1990 | Chaconas et al. . |
| 4,984,944 | 1/1991 | Pennington, Jr. et al. . |
| 5,038,642 | 8/1991 | Alverio et al. . |
| 5,160,232 | 11/1992 | Maier . |
| 5,273,379 | 12/1993 | Nishimura . |
| 5,273,380 | 12/1993 | Musacchia . |
| 5,312,209 | 5/1994 | Lindblom ................... 408/230 |
| 5,350,261 | 9/1994 | Takaya et al. . |
| 5,387,059 | 2/1995 | Borzemsky . |
| 5,423,640 | 6/1995 | Lindblom et al. .......... 408/230 |
| 5,442,979 | 8/1995 | Hsu ............................. 408/230 |
| 5,478,176 | 12/1995 | Stedt et al. . |
| 5,486,075 | 1/1996 | Nakamura et al. ......... 408/230 |
| 5,590,987 | 1/1997 | Bouzounie .................. 408/230 |
| 5,700,113 | 12/1997 | Stone et al. ................. 408/228 |

*Primary Examiner*—Andrea L. Pitts
*Assistant Examiner*—Monica Smith
*Attorney, Agent, or Firm*—Middleton & Reutlinger; Charles G. Lamb, Esq.

[57] ABSTRACT

A drill is provided with a pair of spiral cutting blades having opposed cutting edges to come together at an angle to form a starting tip. Each of the spiral cutting blades includes a primary and a secondary flute which extends longitudinally thereof and is provided with cutting edge segments thereon, one flute being provided with an outer cutting edge segment and a second flute being provided with an inner cutting edge segment. The outer cutting edge segments of each cutting blade are in axial alignment with each other and the center point of the drill bit and perpendicular to an arcuate segment of the outer periphery of the drill.

4 Claims, 2 Drawing Sheets

TWIST DRILL BIT

BACKGROUND OF THE INVENTION

(1) Field of the Invention

This invention relates to drills and drill bits and particularly to the construction of split point drill bits with improved efficiency in the cutting of holes in the work piece.

(2) Discussion of the Prior Art

In the manufacture of split point drill bits for drilling holes in metal, wood, plastic, aluminum and castings, the drill bits usually include four cutting edges, two main or primary cutting edges plus two secondary cutting edges. The two main cutting edges of a split point drill bit are a function of the shape of the grinding wheels that grind helical flutes, the pitch of the helical flutes, and the point angle. The two secondary cutting edges are created by what is commonly referred to as a split point operation. In this operation, a main relief surface of the split point drill bit is relieved through an additional grinding operation creating the secondary cutting edges as well as a secondary relief surface.

Split point drill bits are provided with self-centering capabilities, but the self-centering capabilities of split point drill bits are limited due to the fact that all of the vibrations and the unsoundness of a drill chuck are fully transferred to the point of the drill bit as long as the drill bit is not in the material with its full circumference. This causes the holes drilled to be triangular shaped and over-sized. However, once the full diameter of the drill bit has penetrated the material to be cut, the tip of the drill bit then acts as a bearing providing stability and reducing vibrations. For a good quality hole it is necessary to reduce the initial vibrations by providing stabilization as early as possible. This can be done by pilot points such as the pilot points for the self-centering drill bit taught in U.S. Pat. No. 4,968,193 which teaches a pilot point with a diameter much smaller than the outer diameter of the drill bit wherein this pilot point provides stabilization within a fraction of an inch drilled into the material in which the drill bit is placed.

Another disadvantage of the split point drill bit is that the cutting velocity vectors along the two main or primary cutting edges point in different directions. The cutting velocity vector is always perpendicular to a line drawn from any point of the main cutting edges through the center of the drill bit. These cutting velocity vectors govern the chip flow velocity vectors and hence govern the direction of the chip flow. This means that the chip flow direction varies all along the radius of the main cutting edges. And, different chip flow directions mean that additional energy is consumed to tear the chips apart since the chips can only flow in one direction. Therefore, there is a particular need to provide split point drill bits which provide energy efficient drilling which is particularly useful in cordless drills.

SUMMARY OF THE INVENTION

The present invention is directed to a split point drill bit with improved self-centering capabilities. Further, the present invention is directed to a drill bit which provides for energy efficient drilling. Even further, the present invention provides a split point drill bit which has a pilot point which prevents vibrations during the drilling operation. Also, the present invention provides a drill bit having two main cutting edges aligned with the center line of the drill bit so that all the cutting velocity vectors are parallel and therefore the chip flow directions all along the main cutting edges are parallel. And, the present invention provides a drill bit which offers more energy efficient drilling action thereby reducing heat and wear of the drill bit and extending the life of the drill bit.

More particularly, the present invention provides a drill comprising: a pair of spiral cutting blades having opposed outer edges with inwardly extending cutting edges joined together at an angle to form a starting tip; the pair of spiral cutting blades defining a pair of primary and secondary longitudinal extending spiral flutes therebetween; each of the cutting edges having an inner cutting edge segment and an outer cutting edge segment joined by a radial relief therebetween; the drill being of circular cross-section; and, the outer cutting edge segments being in axial alignment and perpendicular to the tangent to the arcuate segment of the circular cross-section.

Additional features and advantage of the invention will become apparent to those skilled in the art from the following written description and the figures relating thereto.

BRIEF DESCRIPTION OF THE DRAWINGS

The preferred embodiments of the invention will be described with reference to the numerals set forth in the figures wherein.

DESCRIPTION OF THE PREFERRED EMBODIMENT

Figure 1:
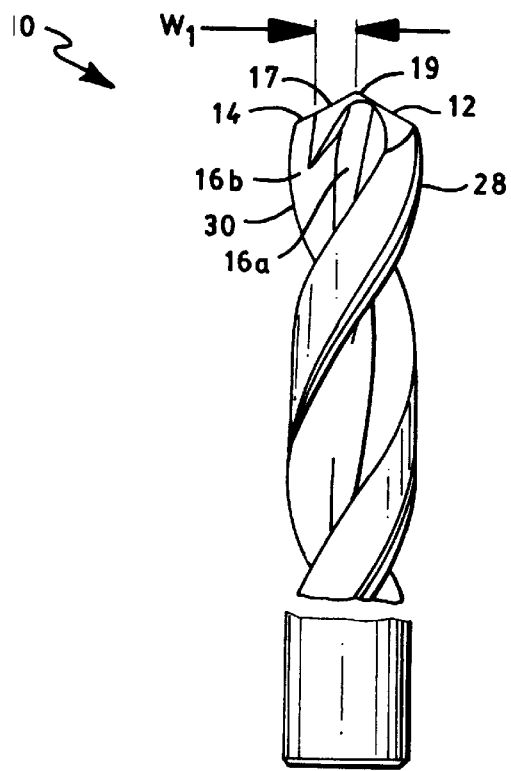
FIG. 1 is a side view of one preferred drill of the present invention.
Figure 2:
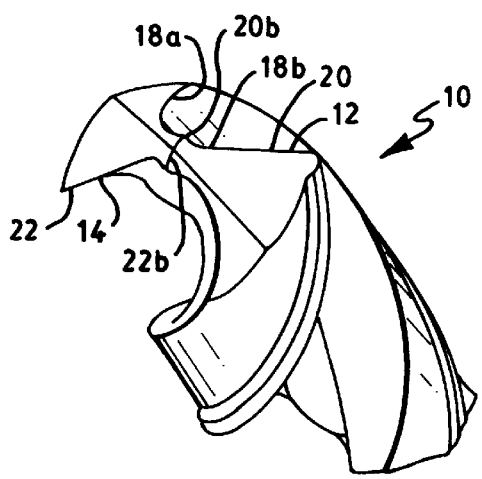
FIG. 2 is a perspective view of the cutting end of the drill of FIG. 1.

In FIGS. 1–4, a fluted cutting drill 10 is shown wherein the drill 10 includes two cutting blades 12 and 14 with a split tip 19 connecting the two cutting blades 12 and 14. Disposed between the blades 12 and 14 are a main flute and a secondary flute. The main flute, identified by numeral 16a, and secondary flute, identified by numeral 16b, are shown in FIG. 1 as being disposed between the cutting blades 14 and 12, respectively. As shown in FIG. 2, the primary flute 18a and secondary flute 18b are disposed between the cutting blades 12 and 14, respectively.

Figure 3:
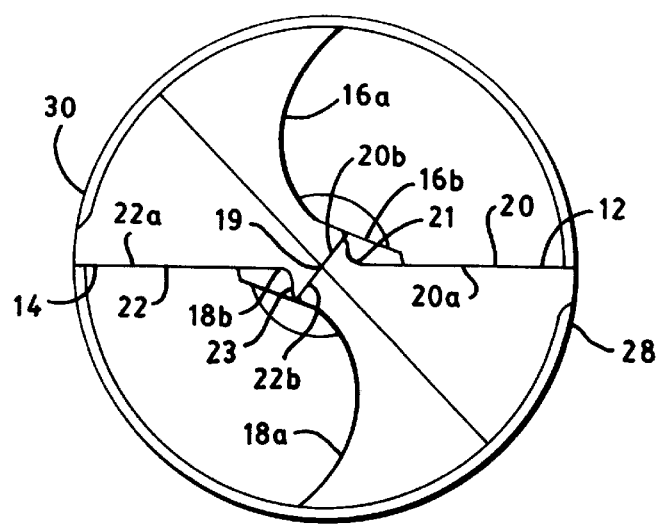
FIG. 3 is an enlarged end view of the drill of FIG. 1.
Figure 4:
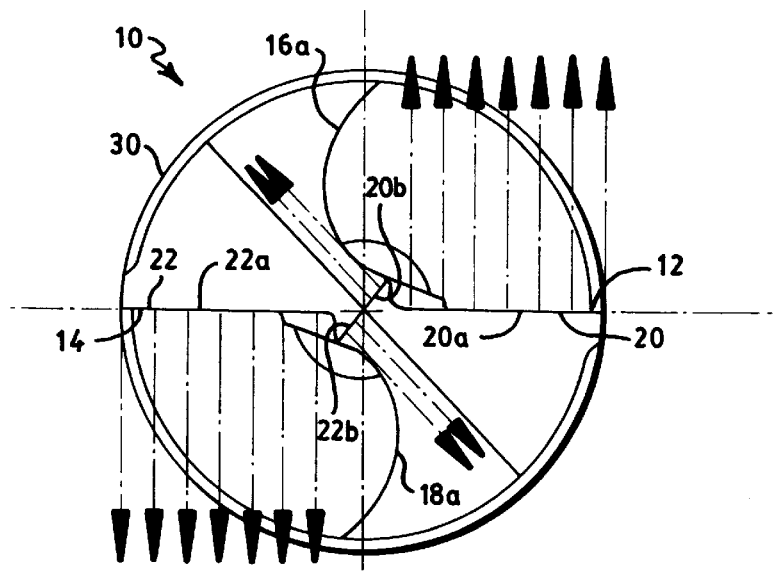
FIG. 4 is an end view of the drill of FIG. 1 showing the cutting velocity vectors of cutting edges of the drill.

The cutting blades 12 and 14 are provided with cutting edges 20, 22, respectively, which extend inwardly from the outer edges 28, 30, respectively. Each cutting edge 20, 22 includes two cutting edge segments identified as numerals 20a, 20b of cutting edge 20 and 22a, 22b of cutting edge 22. As best shown in FIGS. 3 and 4, cutting edges 20 and 22 are in axial alignment with each other with the central axis of the drill being disposed therebetween. Moreover, drill 10 is of circular cross-section and the cutting edges 20 and 22 are perpendicular to the tangents of the opposed arcuate segments of the outer circumference of the drill.

In the Figs. the primary cutting edges are identified by numerals 20a and 22a. As best shown in FIG. 4, in order to provide the main cutting edges 20a and 22a in alignment with the center line of the drill bit and still obtain a straight cutting edge, the two secondary flutes 16b and 18b are therefore necessary. Additionally, radial reliefs 21 and 23 are provided for the secondary or inner cutting edges 20b and 22b. Reliefs 21 and 23 are obtained by a notching operation as best seen in FIG. and identified by the numeral 17. And, as shown in FIG. 1, the width W of the notch depends upon the size of the drill and usually varies from about 0.030" up to the full radius of the drill. That is, the width W of the notch can vary from 0.030" up to the full radius, if the notch is extended all the way out to edge 30. Placement of the notch 17 in respect to the center line of the drill bit can vary to overcome the problem of excessive heat generated on the secondary cutting edges 20b and 22b.

Referring again to FIG. 4, the two outer cutting edges 20a and 22a are aligned with the center line of the drill bit thereby allowing all the cutting velocity vectors to be parallel providing for the chip flow directions all along the cutting edges 20a and 22a to be in parallel. Thus, with the axially aligned cutting edges 20a and 22a perpendicular to the tangents of the opposed arcuate segments of the outer circumference of the drill bit, no energy is wasted to tear the chips apart. Also, inner cutting edges 20b and 22b are aligned with the center line of the drill bit with all the cutting velocity vectors also being in parallel.

The pilot point which helps centering, improves roundness of the hole being drilled, and reduced vibration, is best shown in FIG. 2. In FIG. 2, the diameter of the pilot point is defined by the combined lengths of the secondary cutting edges 20b and 22b.

Figure 5:
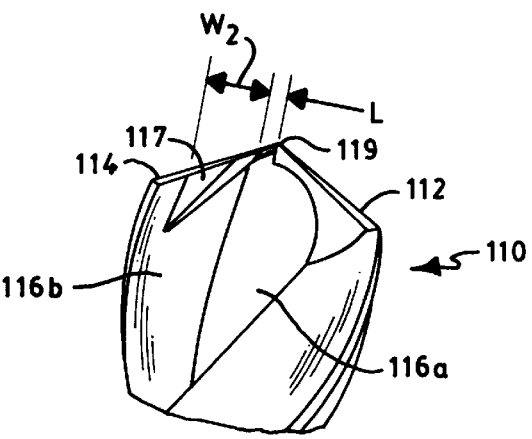
FIG. 5 is a side view of the cutting end of another embodiment of the drill of the present invention; and, FIG. 6 is a perspective view of FIG. 5.
Figure 6:
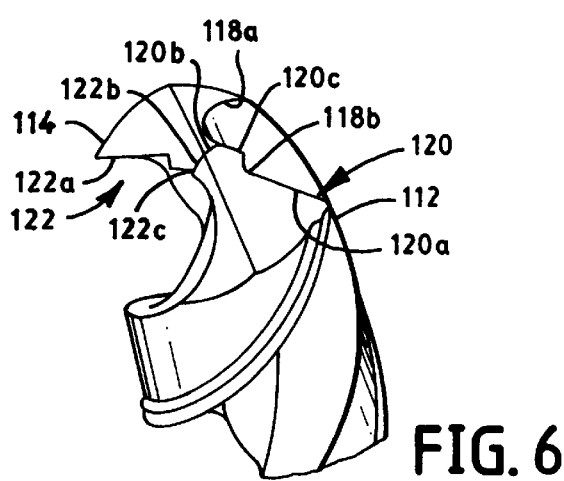

In FIGS. 5 and 6 is shown another preferred embodiment of a drill of the present invention wherein the drill contains six cutting edges. As shown in FIGS. 5 and 6, the drill identified by the numeral 110 is provided with two cutting blades 112 and 114 with a split tip 119 connecting the two cutting blades 112 and 114. Flutes 116a and 116b are disposed between cutting blades 114 and 112, respectively, and flutes 118a and 118b are disposed between blades 112 and 114, respectively. The cutting blades 112 and 114 are provided with cutting edges 120 and 122. The cutting edge 120 includes an outer cutting edge 120a, an inner cutting edge 120b, and a third cutting edge 120c. Cutting edge 122 is also provided with an outer cutting edge 122a, an inner cutting edge 122b, and, a third cutting edge 122c. The cutting edges 120a, 120b and 122a, 122b are created in the same manner as those described for cutting edges 20a, 20b, and 22a, 22b. The third or tertiary cutting edges 120c and 122c are formed by varying the distance L, as shown in FIG. 5, between the center line of the drill and the beginning of the notch 117. The cross-section of the drill 110 remains unchanged but the distance L can vary, depending upon the size of the drill, while maintaining the diameter of the pilot point within a specific range, generally from about 0.045" to 0.147". As best shown in FIG. 6, the pilot point for this embodiment has a diameter defined by the combined length of the cutting edges 120b, 120c, 122b, and 122c.

Even though only two embodiments have been shown and described in the present application, it is realized that various modifications may be made to the preferred embodiments without departing from the scope and spirit of the present invention.

What is claimed is:

1. A drill comprising:

a pair of spiral cutting blades having opposed cutting edges joined together at a center point to form a starting tip;

said pair of spiral cutting blades define a pair of primary and secondary longitudinal extending spiral flutes therebetween;

each of said cutting edges having an inner cutting edge segment and an outer cutting edge segment joined by a radial relief; and, said drill being of circular cross-section, said outer cutting edge segments being in axial alignment and perpendicular to the tangents of the opposed arcuate segments of the outer periphery of said drill, said inner cutting edge segments being in axial alignment and intersect at said center point of said drill said inner cutting segments being at an angle to said outer cutting edge segments.

2. The drill of claim 1, said outer cutting edge segments being axially aligned with a center point of said drill.

3. The drill of claim 1 including a third cutting edge segment in each of said cutting edges.

4. The drill of claim 3 wherein each third cutting edge segment is disposed between an inner cutting edge segment and a radial relief.

* * * * *